M. McGLOCHLIN.
VEHICLE RIM.
APPLICATION FILED SEPT. 27, 1921.

1,410,106.

Patented Mar. 21, 1922.

INVENTOR
Montezuma McGlochlin

UNITED STATES PATENT OFFICE.

MONTEZUMA McGLOCHLIN, OF DENVER, COLORADO.

VEHICLE RIM.

1,410,106.

Specification of Letters Patent.   Patented Mar. 21, 1922.

Application filed September 27, 1921. Serial No. 503,463.

*To all whom it may concern:*

Be it known that I, MONTEZUMA MC-GLOCHLIN, a citizen of the United States, residing at Denver, in the county of Denver and State of Colorado, have invented certain new and useful Improvements in Vehicle Rims, of which the following is a specification.

My invention relates to rims for pneumatic tires, and has for its object to provide a rim for vehicles on which pneumatic tires are used, which rim may be quickly and easily removed from the pneumatic tire without the use of tire tools.

These objects I accomplish with the rim illustrated in the accompanying drawings, in which similar letters and numerals of reference indicate like parts throughout the several views, and as described in the specification forming a part of this application and pointed out in the appended claims.

Figure 1:
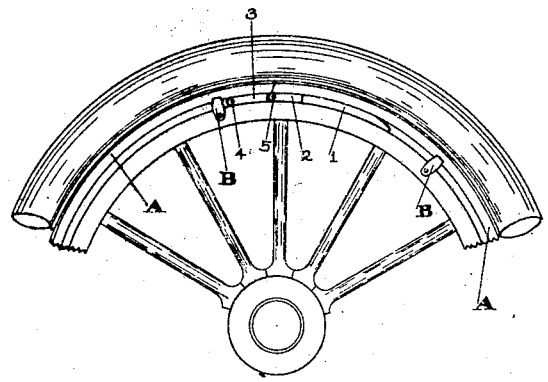
Figure 2:
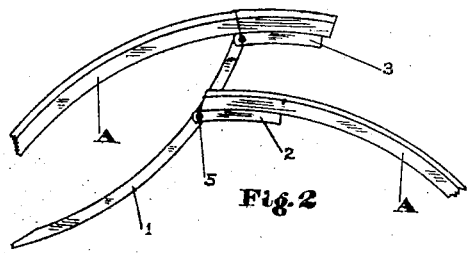
Figure 3:
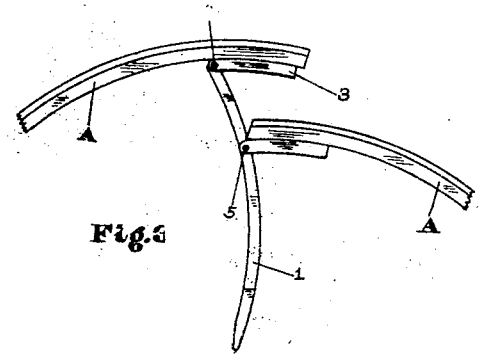
Figure 4:
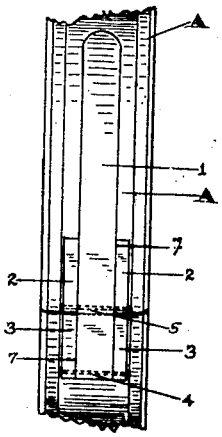

In the drawings in which I have shown a substantial embodiment of my invention, Figure 1 is a side elevation of a portion of an automobile wheel showing my invention in place thereon. Figure 2 is a portion of the rim with the tire and wheel removed, and showing the device fully operated to collapse the rim. Figure 3 is a portion of the rim with the device only partially operated. Figure 4 is an elevation showing a portion of the rim with my device in place thereon at the joint.

In removing from and replacing deflated pneumatic tires on vehicle wheel rims of the demountable rim type some use the common tools about the vehicle, others provide tire tools of special and intricate construction and operation to remove the tire. I provide an improved rim having special members attached thereon which are easily operated, simple and efficient, and by which the rim is lessened in circumference and the tire changed ready for inflation in less time than now practiced. In the present invention the common channel metal rim form A is used having outwardly extended flanges thereon, and where the joint is made the ends of the channel material are cut at an angle to form a close fitting joint. On the inner face of said channel and bottom thereof are attached, or formed integral therewith, four flat lugs 2 and 3 positioned on opposite sides and at or near the joint in said rim. They are thin enough not to interfere with the placing of the rim on the felloe of the wheel and are spaced to not interfere with the common holding lugs B. A lever 1 is hingedly connected at one end by the pivot 4 with said lugs 3, and fulcrumed on the other two of said lugs 2 by the pivot pin 5. A longitudinally disposed channel recess 7 is left between said lugs 2 and 3 to receive the said lever 1 when said lever has been thrown into the locked position, as shown in Figures 1 and 4.

The operation of my device is as follows: Desiring to remove a tire the operator moves the lever 1 toward the axis of the rim A, which movement draws the ends of the rim to the position shown in Figure 3 and completing the said movement collapses the rim and throws the device to the position shown in Figure 2. The circumference of the rim is thus reduced and the tire may be easily removed and the other tire placed around the rim. The movement of the lever 1 in the reverse direction will extend the rim and fasten it within the tire by the spring tension of the rim, which rim is uncut except at the joint. It will be noticed in Figure 4 that the lugs 2—2 and 3—3 integral with the rim extend for considerable distances on either side of the split, and the lever 1 fits snugly in the channel between the lugs. By thus extending the lugs along the sides of the rim and making them integral therewith and having the lever fitting snugly from one end to the other of the extended lugs on both sides of the rim, I have found by experience that this construction secures a maximum strength of these parts to resist any sidewise thrust of either end of the rim, and this being the weakest point in a split rim, my construction offers the maximum strength just where it is needed.

I thus provide a new and novel vehicle rim with link connections at the joint made by the lever 1, a portion of which lever is extended as a lever arm for operating the device, and two pairs of spaced lugs to which the lever is pivoted.

Having described my invention and its operation I desire to secure by Letters Patent and claim:—

In a device of the character described, a one piece split channel rim having inclined abutting ends at the split, a pair of spaced lugs integral with the inner face of each end of said rim adjacent the split therein, one pair of lugs projecting beyond one end of the rim to which they are attached, and extending along parallel with the side of the rim, the other pair of lugs extending to within a short distance of the other end of the rim to abut the ends of the other pair of lugs, the lugs forming a continuous channel across the ends of the rim, a lever pivoted at one end to the ends of one pair of said lugs and pivoted to the projecting ends of the other pair of said lugs, and lying snugly in the channel between both pair of lugs when the rim is extended, the construction being such as to offer the maximum resistance to a sidewise strain on the ends of the rim.

In testimony whereof, I have affixed my signature.

MONTEZUMA McGLOCHLIN.